United States Patent
Aoki et al.

(10) Patent No.: US 7,933,434 B2
(45) Date of Patent: Apr. 26, 2011

(54) VEHICLE AND LANE MARK RECOGNIZES

(75) Inventors: Tomoyoshi Aoki, Wako (JP); Sachio Kobayashi, Wako (JP); Naoki Mori, Wako (JP); Takuma Nakamori, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 862 days.

(21) Appl. No.: 11/918,453

(22) PCT Filed: Apr. 18, 2006

(86) PCT No.: PCT/JP2006/308102
§ 371 (c)(1),
(2), (4) Date: Oct. 15, 2007

(87) PCT Pub. No.: WO2006/118020
PCT Pub. Date: Nov. 9, 2006

(65) Prior Publication Data
US 2008/0310679 A1  Dec. 18, 2008

(30) Foreign Application Priority Data

Apr. 28, 2005  (JP) .............................. 2005-131177

(51) Int. Cl.
*G06K 9/00* (2006.01)
(52) U.S. Cl. ........ 382/104; 382/105; 382/106; 382/119; 340/435; 348/113; 700/23
(58) Field of Classification Search .................. 382/104, 382/105, 106, 119; 340/435, 436, 437, 937, 340/429; 701/23–28; 348/113–120
See application file for complete search history.

(56) References Cited

U.S. PATENT DOCUMENTS
6,546,118 B1 * 4/2003 Iisaka et al. ................... 382/104
(Continued)

FOREIGN PATENT DOCUMENTS
JP   3-268111 A   11/1991
(Continued)

OTHER PUBLICATIONS

ThreeFeatures based automatic lane detection algorithm(TFALDA) for autonomous driving; Young et al Dec. 2003.*

(Continued)

*Primary Examiner* — Daniel G Mariam
*Assistant Examiner* — Nancy Bitar
(74) *Attorney, Agent, or Firm* — Arent Fox LLP

(57) ABSTRACT

A vehicle capable of preventing detection of stud-type lane marks from being impossible and a vehicle having a lane mark recognizer are provided. The vehicle includes installation interval recognizing means (21) which recognizes an interval (L) between Botts Dots, vehicle speed recognizing means (22) which recognizes a traveling speed (v) of the vehicle, image synthesizing means (13) which generates synthesized image data (M3) by combining image data (M1) stored in an image memory (11) through an image input circuit (10) and image data (M2) stored in an image memory (12) through the same, imaging timing determining means (20) which determines the timing of imaging by a camera (2) on the basis of the interval (L) and the traveling speed (v) when acquiring the image data (M1, M2) in such a way that the positions of the Botts Dots in the image data (M1, M2) are different therebetween, and Botts Dots detecting means (14) which detects the Botts Dots from the synthesized image data (M3).

4 Claims, 3 Drawing Sheets

U.S. PATENT DOCUMENTS

| | | | |
|---|---|---|---|
| 7,327,234 B2 * | 2/2008 | Egami et al. | 340/429 |
| 7,346,190 B2 * | 3/2008 | Taniguchi et al. | 382/104 |
| 7,612,800 B2 * | 11/2009 | Okada et al. | 348/169 |
| 2005/0135658 A1 | 6/2005 | Yamamoto et al. | |

FOREIGN PATENT DOCUMENTS

| | | |
|---|---|---|
| JP | 7-28975 A | 1/1995 |
| JP | 11-203458 A | 7/1999 |
| JP | 2003-123058 A | 4/2003 |
| JP | 2003-317106 A | 11/2003 |
| WO | WO 2005/111966 A1 | 11/2005 |

OTHER PUBLICATIONS

Toward Autonomous Driving:The CMU Navlab p. 31-42; Thorpe et al , Aug. 1991.*

* cited by examiner

VEHICLE AND LANE MARK RECOGNIZES

CROSS-REFERENCE TO RELATED APPLICATION

This application is a National Stage entry of International Application No. PCT/JP2006/308102 filed Apr. 18, 2006, the entire specification claims and drawings of which are incorporated herewith by reference.

TECHNICAL FIELD

The present invention relates to a vehicle and a lane mark recognizer having a function of recognizing stud-type lane marks provided on a road.

BACKGROUND ART

Conventionally, there is known a lane mark recognizer which recognizes lane marks for dividing a traffic lane provided on a road on the basis of image data acquired by an in-vehicle camera which captures an image of the road ahead of the vehicle. As the lane marks provided on the road, there are used linear lane marks such as lane boundary lines (white lines) and stud-type lane marks which are discretely provided such as Botts Dots or cat's eyes.

Note that the linear lane marks can be detected by a straight line extraction technique such as a Hough transform while the stud-type lane marks cannot be detected by the straight line extraction technique. Therefore, there has been suggested a lane mark recognizer capable of detecting stud-type lane marks by using a pattern matching technique (for example, refer to Japanese Laid-Open No. 2003-317106).

The above lane mark recognizer, however, has a problem in that in some cases it cannot detect stud-type lane marks due to an increase in a difference between the shape of the stud-type lane marks in image data and a reference shape for pattern matching when the road image data is captured in cases where a part of the stud-type lane marks is broken or depending on how the light impinges on the stud-type lane marks.

DISCLOSURE OF THE INVENTION

Problem to be Solved by the Invention

It is an object of the present invention to solve the above problem and to provide a vehicle and a lane mark recognizer which prevent detection of stud-type lane marks from being impossible.

Means for Solving the Problem

The present invention has been provided to achieve the above object, and therefore a vehicle according to present invention comprises: an imaging means; an image data acquisition means which acquires image data of a road captured by the imaging means; an installation interval recognizing means which recognizes an interval between stud-type lane marks provided on the road; a vehicle speed recognizing means which recognizes the traveling speed of the vehicle; an image synthesizing means which generates synthesized image data by combining a plurality of image data acquired by the image data acquisition means; an imaging timing determining means which determines the timing of imaging by the imaging means on the basis of the interval and the traveling speed when acquiring the plurality of image data combined by the image synthesizing means using the image data acquisition means in such a way that the positions of the stud-type lane marks in the plurality of image data are different between the respective image data; and a lane mark detecting means which detects the stud-type lane marks from the synthesized image data generated by the image synthesizing means.

Further, a lane mark recognizer according to the present invention comprises: an image data acquisition means which acquires image data of a road captured by imaging means; installation interval recognizing means which recognizes an interval between stud-type lane marks provided on the road; a vehicle speed recognizing means which recognizes the traveling speed of the vehicle; an image synthesizing means which generates synthesized image data by combining a plurality of image data acquired by the image data acquisition means; an imaging timing determining means which determines the timing of imaging by the imaging means on the basis of the interval and the traveling speed when acquiring the plurality of image data combined by the image synthesizing means using the image data acquisition means in such a way that the positions of the stud-type lane marks in the plurality of image data are different between the respective image data; and a lane mark detecting means which detects the stud-type lane marks from the synthesized image data generated by the image synthesizing means.

According to the vehicle of the present invention and the lane mark recognizer of said present invention, it is possible to change the positions of the stud-type lane marks in the acquired image data of the road by determining the timing of imaging by the imaging means on the basis of the interval between the stud-type lane marks and the traveling speed of the vehicle using the imaging timing determining means. Moreover, the image synthesizing means synthesizes the plurality of image data captured by the imaging means at the timing determined in such a way that the positions of the stud-type lane marks are different and acquired by the image data acquisition means, whereby it becomes possible to acquire the synthesized image data containing a greater number of stud-type lane marks than in each of the yet-to-be-combined image data.

In this instance, a greater number of detectable lane marks can be expected by detecting the stud-type lane marks from the synthesized image data using the lane mark detecting means. Therefore, even if there are some undetectable lane marks, other lane marks are more likely to be detected, which prevents recognition of lane marks from being impossible.

According to a first aspect of the vehicle of the present invention and the lane mark recognizer of the present invention, the imaging timing determining means determines a second time point at which the vehicle travels from a first time point at which an image is captured by the imaging means by one half of the interval between the lane marks as the next timing of imaging by the imaging means and the image synthesizing means generates the synthesized image data by combining image data of the image captured at the first time point with image data of an image captured at the second time point, which are acquired by the image data acquisition means.

According to the invention, the imaging timing determining means determines the second time point at which the vehicle travels from the first time point at which the previous image data is acquired by one half of the interval L as the next timing of acquiring the image data, whereby the lane marks in the image data acquired at the next time can be positioned roughly in the middle of lane marks adjacent to each other in the image data acquired at the previous time. This allows the widest interval between the stud-type lane marks adjacent to each other in the synthesized image data, which thereby prevents the recognition of the stud-type lane marks from being impossible due to a change in the shape of the stud-type lane marks due to a contact between the stud-type lane marks.

According to a second aspect of the vehicle of the present invention and the lane mark recognizer of the present invention, the imaging timing determining means determines the second time point after an elapse of time Tv calculated according to the equation (3) shown below from the first time point at which the image is captured by the imaging means as the next timing of imaging by the imaging means and the image synthesizing means generates the synthesized image data by combining image data of the image captured at the first time point with image data of an image captured at the second time point, which are acquired by the image data acquisition means.

$$Tv=L/v \times (n+0.5) \quad (3)$$

where L is the interval between the stud-type lane marks, v is the vehicle speed, and n is a minimum integer with Tv≧Tmin (given minimum time).

According to the invention, for example, with securing an imaging interval of the imaging means set longer than an exposure time required according to the sensitivity of the imaging means or than the minimum time Tmin determined according to the minimum imaging interval or the like of the imaging means, the timing of imaging by the imaging means can be determined in such a way that the stud-type lane marks in the image data of the image captured at the second time point are located in the vicinity of the middle position between the stud-type lane marks adjacent to each other in the image data of the image captured at the first time point.

BEST MODE FOR CARRYING OUT THE INVENTION

A preferred embodiment of the present invention will be described with reference to FIG. 1 to FIG. 3. FIG. 1 is a general configuration diagram of a lane mark recognizer according to the present invention; FIG. 2 is an explanatory diagram of image synthesis; and FIG. 3 is an explanatory diagram showing an example of determining the timing of imaging a road by a camera 2 in a time series.

Referring to FIG. 1, a lane mark recognizer 1 is mounted on a vehicle when used and recognizes traffic lanes by detecting Botts Dots (corresponding to stud-type lane marks of the present invention) provided on the road to divide the traffic lane.

The lane mark recognizer 1 includes an image input circuit 10 which inputs an image signal Im_sig output from the camera 2 (corresponding to imaging means of the present invention), which is mounted on the vehicle to capture an image of the road ahead of the vehicle, and stores the image signal Im_sig into image memories 11 and 12; image synthesizing means 13 which generates synthesized image data M3 by combining image data M1 stored in the image memory 11 with image data M2 stored in the image memory 12; Botts Dots detecting means 14 (corresponding to lane mark detecting means of the present invention) which detects Botts Dots from the synthesized image data M3; and lane recognizing means 15 which recognizes the traffic lane on the basis of Botts Dots detection data BD_s showing a Botts Dots detection result of the Botts Dots detecting means 14, wherein the lane recognizing means 15 outputs lane recognition data DL_s showing information on the recognized lane.

The image input circuit 10 and the image memories 11 and 12 constitute image data acquisition means of the present invention.

The lane mark recognizer 1 further includes installation interval recognizing means 21 which recognizes an interval L between Botts Dots on the basis of Botts Dots standard data BD_dat previously stored in a memory 23, vehicle speed recognizing means 22 which is provided on the vehicle to recognize a traveling speed v thereof on the basis of a detection signal Vs of a vehicle speed sensor 3 which detects a rotational speed of a wheel, and imaging timing determining means 20 which determines the timing of imaging the road by the camera 2 on the basis of the interval L between Botts Dots and the traveling speed v of the vehicle.

Subsequently, a series of Botts Dots detection processes by the lane mark recognizer 1 will be described with reference to FIG. 1 and FIG. 2. First, the imaging timing determining means 20 determines the timing of imaging the road by the camera 2 by performing arithmetic processing according to the following equation (4) using the interval L between Botts Dots and the traveling speed v of the vehicle.

$$Tv=L/v \times (n+0.5) \quad (4)$$

where L is the interval between Botts Dots, v is the traveling speed of the vehicle, and n is determined with Tv≧Tmin (minimum time).

Note that the minimum time Tmin means a time period set longer than an exposure time required according to the sensitivity of the camera 2 and than the minimum imaging interval of the camera 2. The imaging timing determining means 20 outputs an imaging instruction signal Tm_cnt for instructing a start of imaging to the camera 2 at an arbitrary first time point $T_1$ and then outputs an imaging instruction signal Tm_cnt to the camera 2 at a second time point $T_2(=T_1+Tv)$ after an elapse of Tv from the first time point $T_1$.

Then, the image input circuit 10 inputs the image signal Im_sig of the image captured by the camera 2 according to the imaging instruction signal Tm_cnt output at the first time point $T_1$ and stores it as the image data M1 into the image memory 11. Similarly, the image input circuit 10 inputs the image signal Im_sig of the image captured by the camera 2 according to the imaging instruction signal Tm_cnt output at the second time point $T_2$ and stores it as the image data M2 into the image memory 12.

Then, if n is 0 in the above equation (4), the second time point $T_2$ corresponds to a time point at which the vehicle has traveled from the first time point $T_1$ by one half of the interval L between the Botts Dots. In this case, as shown in FIG. 2, the positions of Botts Dots 6a to 6e in the image data M2 of the image captured at the second time point $T_2$ shift by approximately L/2 from the positions of Botts Dots 5a to 5e in the image data M1 of the image captured at the first time point $T_1$.

For example, the Botts Dot 6d in the image data M2 is located approximately in the middle position between the Botts Dot 5c and the Botts Dot 5d in the image data M1. Similarly, other Botts Dots in the image data M2 are each located approximately in the middle position between the Botts Dots adjacent to each other in the image data M1.

Therefore, the image synthesizing means 13 can generate a synthesized image M3 generated by combining the image data M1 and the image data M2 in such a way that the Botts Dots 5a to 5e in the image data M1 do not overlap the Botts Dots 6a to 6e in the image data M2. Moreover, the Botts Dots detecting means 14 detects Botts Dots from the synthesized image M3, which leads to an increase in the number of Botts Dots detected in the synthesized image M3.

Therefore, even if some Botts Dots cannot be detected among the Botts Dots in the synthesized image data M3, the lane recognizing means 15 can recognize a traffic lane from information data of the positions of other detected Botts Dots.

Moreover, if n is 1, 2, 3, or the like in the above equation (4), the second time point is obtained by L/v (time taken for the vehicle to travel by the interval L between Botts Dots)× n+L/2v (time taken for the vehicle to travel by one half of the interval L between Botts Dots), and therefore the synthesized image data M3 can also be generated in such a way that the Botts Dots in the image data M1 do not overlap the Botts Dots in the image data M2 similarly to the case where n is 0.

Moreover, if the traveling speed of the vehicle is low and Tv calculated according to the equation (4) exceeds a maximum time Tmax which is determined according to a responsive request or the like from a control system of the vehicle, the imaging timing determining means 20 calculates Tv according to the following equation (5) and equation (6).

$$m = \text{int}(L/v \times 0.5/T\text{max}) + 1 \quad (5)$$

$$Tv = L/v \times 0.5/m \quad (6)$$

where int(L/v×0.5/Tmax) is a maximum integer that does not exceed (L/v×0.5/Tmax).

The reference character m calculated according to the above equation (5) is the number of cycles of the maximum time Tmax contained in the time (L/2v) taken for the vehicle to travel by one half of the interval L between Botts Dots. Therefore, Tv can be determined using the equation (6) in such a way that the Botts Dots in the image data M1 do not overlap the Botts Dots in the image data M2 within a range where the value does not exceed the maximum time Tmax.

Referring to FIG. 3, there is shown an explanatory diagram showing an example of determining the timing of imaging the road by the camera 2 by calculating the above equation (5) and equation (6) in the time series. In FIG. 3, m calculated according to the equation (5) is 3, and $t_1$ to $t_4$ and $t_4$ to $t_7$ in FIG. 3 each indicate the time taken for the vehicle to travel by one half of the interval L between Botts Dots. Then, the synthesized image data can be generated from two image data at time points between which the vehicle travels by L/2 by synthesizing the image data captured at two time points (in FIG. 3, $t_1$ and $t_4$, $t_2$ and $t_5$, or $t_3$ and $t_6$) with an interval (in FIG. 3, a, b, or c) of m cycles of Tv, which is calculated according to the equation (6).

Although the next timing of imaging is considered to be a second time point after an elapse of time during which the vehicle travels from the first time point $T_1$ by one half of the interval L between Botts Dots according to the equation (4), any other method can be used to achieve the effect of the present invention by determining the second time point in such a way that the positions of the Botts Dots in the image data M1 are different from those of the Botts Dots in the image data M2.

Further, although the image synthesizing means 13 generates the synthesized image data M3 by combining the two image data M1 and M2 in this embodiment, it is also possible to generate synthesized image data by combining three or more image data.

DESCRIPTION OF REFERENCE NUMBERS

Figure 1:
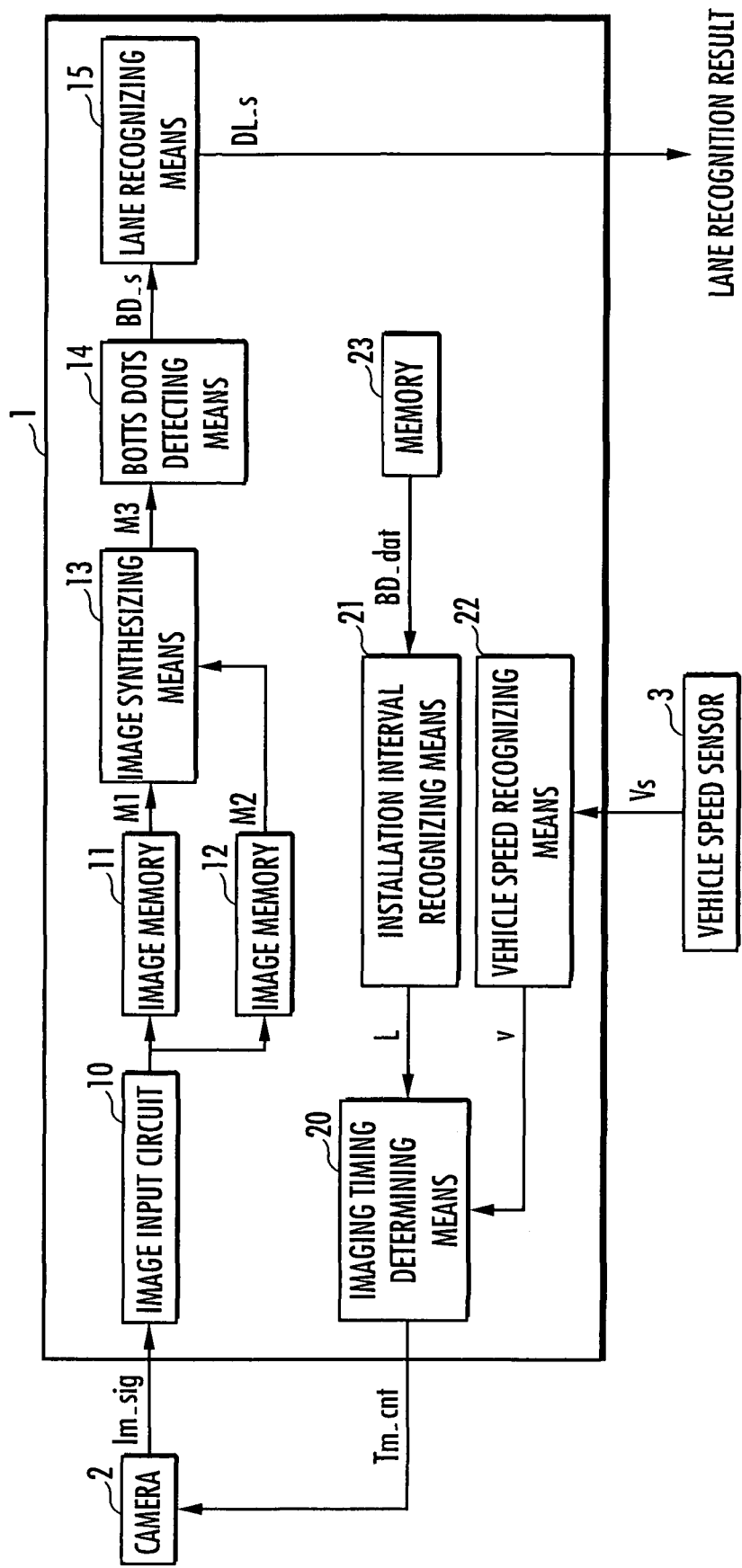
FIG. 1 is a general configuration diagram of a lane mark recognizer according to the present invention.
Figure 2:
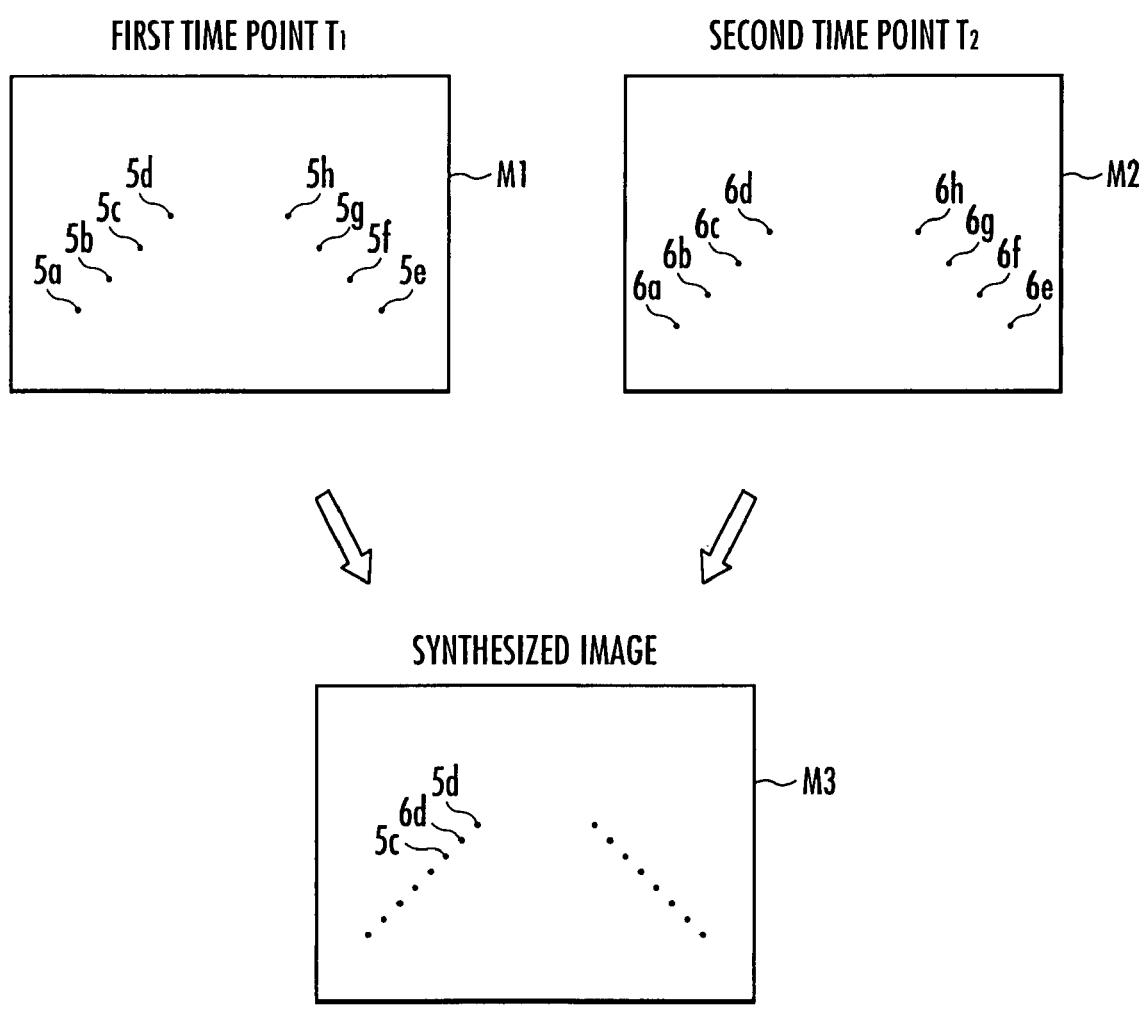
FIG. 2 is an explanatory diagram of image synthesis.
Figure 3:
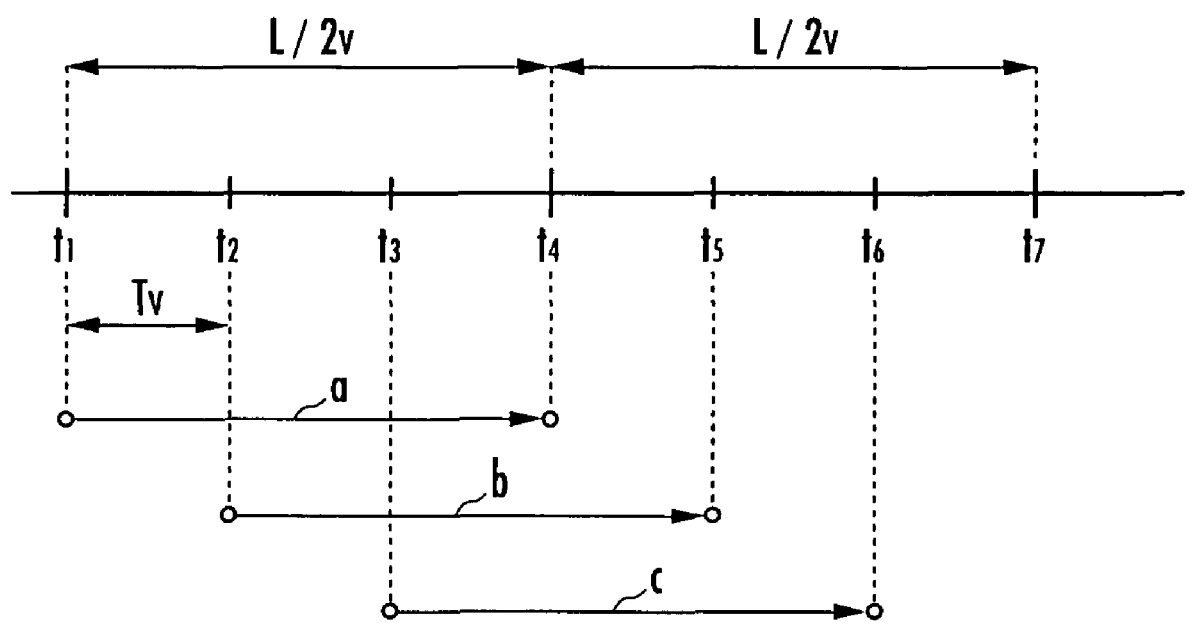
FIG. 3 is an explanatory diagram showing an example of determining the timing of imaging a road by a camera 2 in the time series.

1 Lane mark recognizer
2 Camera
3 Vehicle speed sensor
5, 6 Botts Dots
10 Image input circuit
11, 12 Image memory
13 Image synthesizing means
14 Botts Dots detecting means
15 Lane recognizing means
20 Imaging timing determining means
21 Installation interval recognizing means
22 Vehicle speed recognizing means

The invention claimed is:

1. A vehicle comprising:
an imaging means;
an image data acquisition means which acquires image data of a road captured by the imaging means;
an installation interval recognizing means which recognizes an interval between stud-type lane marks provided on the road;
a vehicle speed recognizing means which recognizes the traveling speed of the vehicle;
an image synthesizing means which generates synthesized image data by combining a plurality of image data acquired by the image data acquisition means;
an imaging timing determining means which determines the timing of imaging by the imaging means on the basis of the interval and the traveling speed when acquiring the plurality of image data combined by the image synthesizing means using the image data acquisition means in such a way that the positions of the stud-type lane marks in the plurality of image data are different between the respective image data; and
a lane mark detecting means which detects the stud-type lane marks from the synthesized image data generated by the image synthesizing means, wherein:
the imaging timing determining means determines a second time point at which the vehicle travels from a first time point at which an image is captured by the imaging means by one half of the interval between the lane marks as the next timing of imaging by the imaging means; and
the image synthesizing means generates the synthesized image data by combining image data of the image captured at the first time point with image data of an image captured at the second time point, which are acquired by the image data acquisition means.

2. A vehicle comprising:
an imaging means;
an image data acquisition means which acquires image data of a road captured by the imaging means;
an installation interval recognizing means which recognizes an interval between stud-type lane marks provided on the road;
a vehicle speed recognizing means which recognizes the traveling speed of the vehicle;
an image synthesizing means which generates synthesized image data by combining a plurality of image data acquired by the image data acquisition means;
an imaging timing determining means which determines the timing of imaging by the imaging means on the basis of the interval and the traveling speed when acquiring the plurality of image data combined by the image synthesizing means using the image data acquisition means in such a way that the positions of the stud-type lane marks in the plurality of image data are different between the respective image data; and a lane mark detecting means which detects the stud-type lane marks from the synthesized image data generated by the image synthesizing means, wherein:

the imaging timing determining means determines a second time point after an elapse of time Tv calculated according to the following equation (1) from a first time point at which the image is captured by the imaging means as the next timing of imaging by the imaging means; and the image synthesizinq means generates the synthesized image data by combining image data of the imam captured at the first time point with image data of an image captured at the second time point, which are acquired by the image data acquisition means:

$$Tv = L/v \times (n + 0.5) \qquad (1)$$

where L is the interval between the stud-type lane marks, v is the vehicle speed, and n is a minimum integer with Tv≧Tmin (given minimum time).

3. A lane mark recognizer comprising:

an image data acquisition means which acquires image data of a road captured by imaging means;

an installation interval recognizing means which recognizes an interval between stud-type lane marks provided on the road;

a vehicle speed recognizing means which recognizes the traveling speed of the vehicle;

an image synthesizing means which generates synthesized image data by combining a plurality of image data acquired by the image data acquisition means;

an imaging timing determining means which determines the timing of imaging by the imaging means on the basis of the interval and the traveling speed when acquiring the plurality of image data combined by the image synthesizing means using the image data acquisition means in such a way that the positions of the stud-type lane marks in the plurality of image data are different between the respective image data; and a lane mark detecting means which detects the stud-type lane marks from the synthesized image data generated by the image synthesizing means, wherein:

the imaging timing determining means determines a second time point at which the vehicle travels from a first time point at which an image is captured by the imaging means by one half of the interval between the lane marks as the next timing of imaging by the imaging means; and the image synthesizing means generates the synthesized image data by combining image data of the image captured at the first time point with image data of an image captured at the second time point, which are acquired by the image data acquisition means.

4. A lane mark recognizer comprising:

an image data acquisition means which acquires image data of a road captured by the imaging means;

an installation interval recognizing means which recognizes an interval between stud-type lane marks provided on the road;

a vehicle speed recognizing means which recognizes the traveling speed of the vehicle;

an image synthesizing means which generates synthesized image data by combining a plurality of image data acquired by the image data acquisition means;

an imaging timing determining means which determines the timing of imaging by the imaging means on the basis of the interval and the traveling speed when acquiring the plurality of image data combined by the image synthesizing means using the image data acquisition means in such a way that the positions of the stud-type lane marks in the plurality of image data are different between the respective image data; and a lane mark detecting means which detects the stud-type lane marks from the synthesized image data generated by the image synthesizing means, wherein:

the imaging timing determining means determines a second time point after an elapse of time Tv calculated according to the following equation (2) from a first time point at which the image is captured by the imaging means as the next timing of imaging by the imaging means; and the image synthesizing means generates the synthesized image data by combining image data of the image captured at the first time point with image data of an image captured at the second time point, which are acquired by the image data acquisition means:

$$Tv = L/v \times (n + 0.5) \qquad (2)$$

where L is the interval between the stud-type lane marks, v is the vehicle speed, and n is a minimum integer with Tv≧Tmin (given minimum time).

* * * * *

UNITED STATES PATENT AND TRADEMARK OFFICE
CERTIFICATE OF CORRECTION

| | |
|---|---|
| PATENT NO. | : 7,933,434 B2 |
| APPLICATION NO. | : 11/918453 |
| DATED | : April 26, 2011 |
| INVENTOR(S) | : Tomoyoshi Aoki et al. |

It is certified that error appears in the above-identified patent and that said Letters Patent is hereby corrected as shown below:

On the Title Page:

In Item (54)   Title, please correct the Title to read as follows:

(54)   VEHICLE AND LANE MARK RECOGNIZER

Signed and Sealed this
Twenty-first Day of June, 2011

David J. Kappos
*Director of the United States Patent and Trademark Office*

UNITED STATES PATENT AND TRADEMARK OFFICE
CERTIFICATE OF CORRECTION

PATENT NO.         : 7,933,434 B2                                   Page 1 of 1
APPLICATION NO.    : 11/918453
DATED              : April 26, 2011
INVENTOR(S)        : Tomoyoshi Aoki et al.

It is certified that error appears in the above-identified patent and that said Letters Patent is hereby corrected as shown below:

On the Title Page, Item (54) and at Column 1, line 1,

Please correct the Title to read as follows:

VEHICLE AND LANE MARK RECOGNIZER

This certificate supersedes the Certificate of Correction issued June 21, 2011.

Signed and Sealed this
Twenty-sixth Day of July, 2011

David J. Kappos
*Director of the United States Patent and Trademark Office*